April 3, 1934.  T. V. BUCKWALTER  1,953,103
CAR TRUCK
Filed June 7, 1930  4 Sheets-Sheet 1
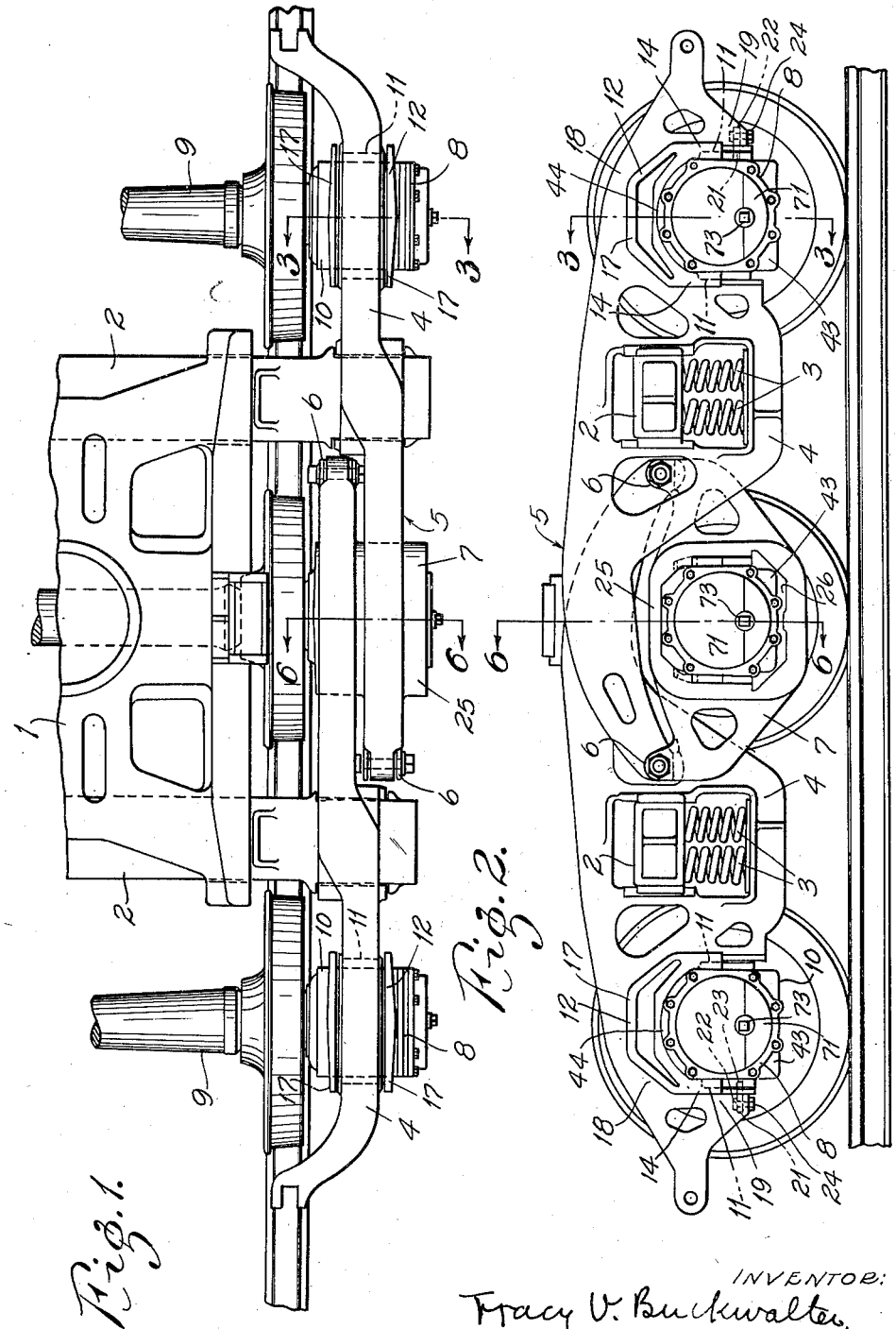
INVENTOR:
Tracy V. Buckwalter,
by Carr, Kerr & Gravely
HIS ATTORNEYS.

April 3, 1934.  T. V. BUCKWALTER  1,953,103
CAR TRUCK
Filed June 7, 1930  4 Sheets-Sheet 2
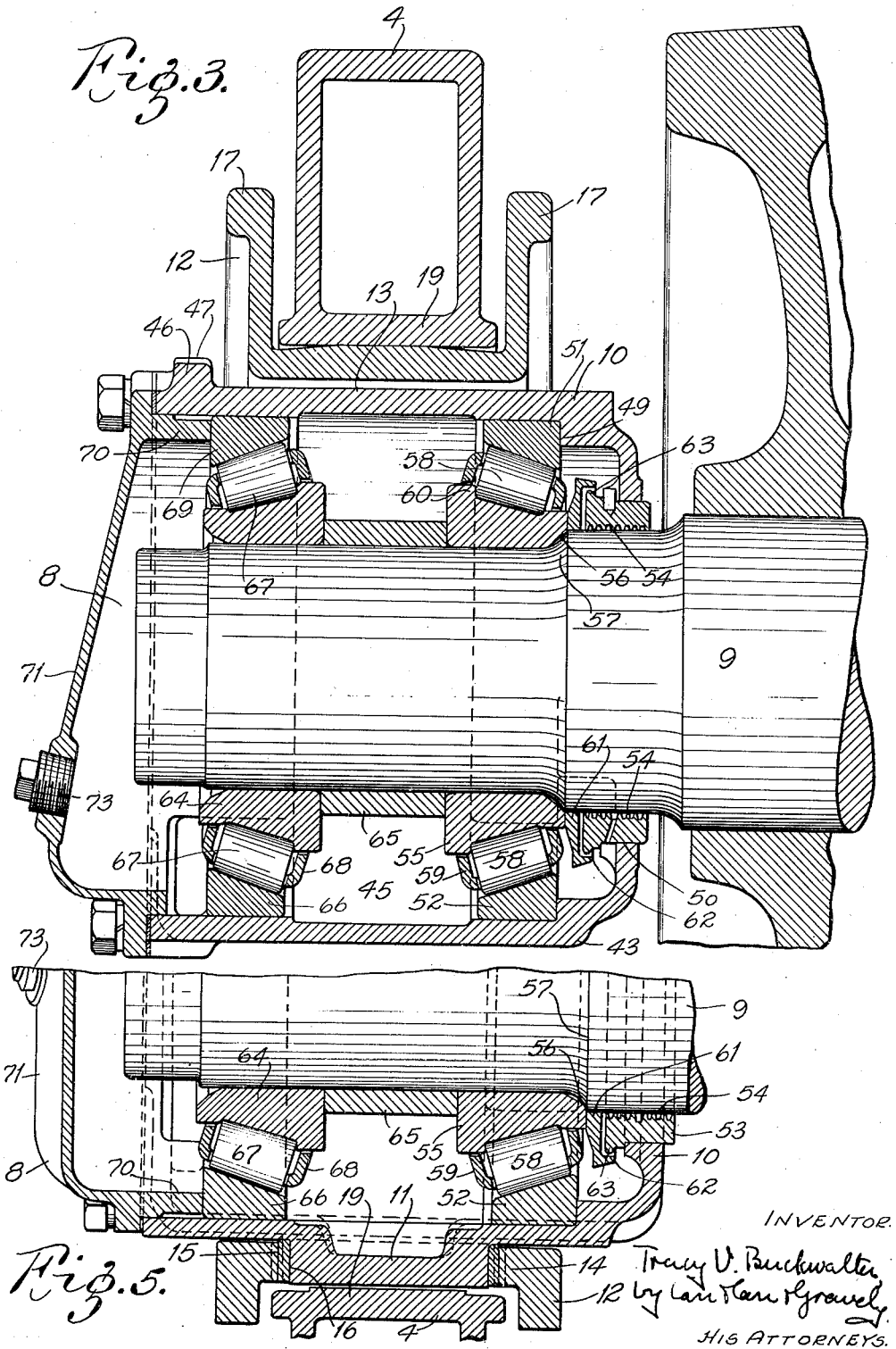

April 3, 1934.  T. V. BUCKWALTER  1,953,103
CAR TRUCK
Filed June 7, 1930  4 Sheets-Sheet 3

INVENTOR
Tracy V. Buckwalter
by Carr Kerr & Gravely
HIS ATTORNEYS

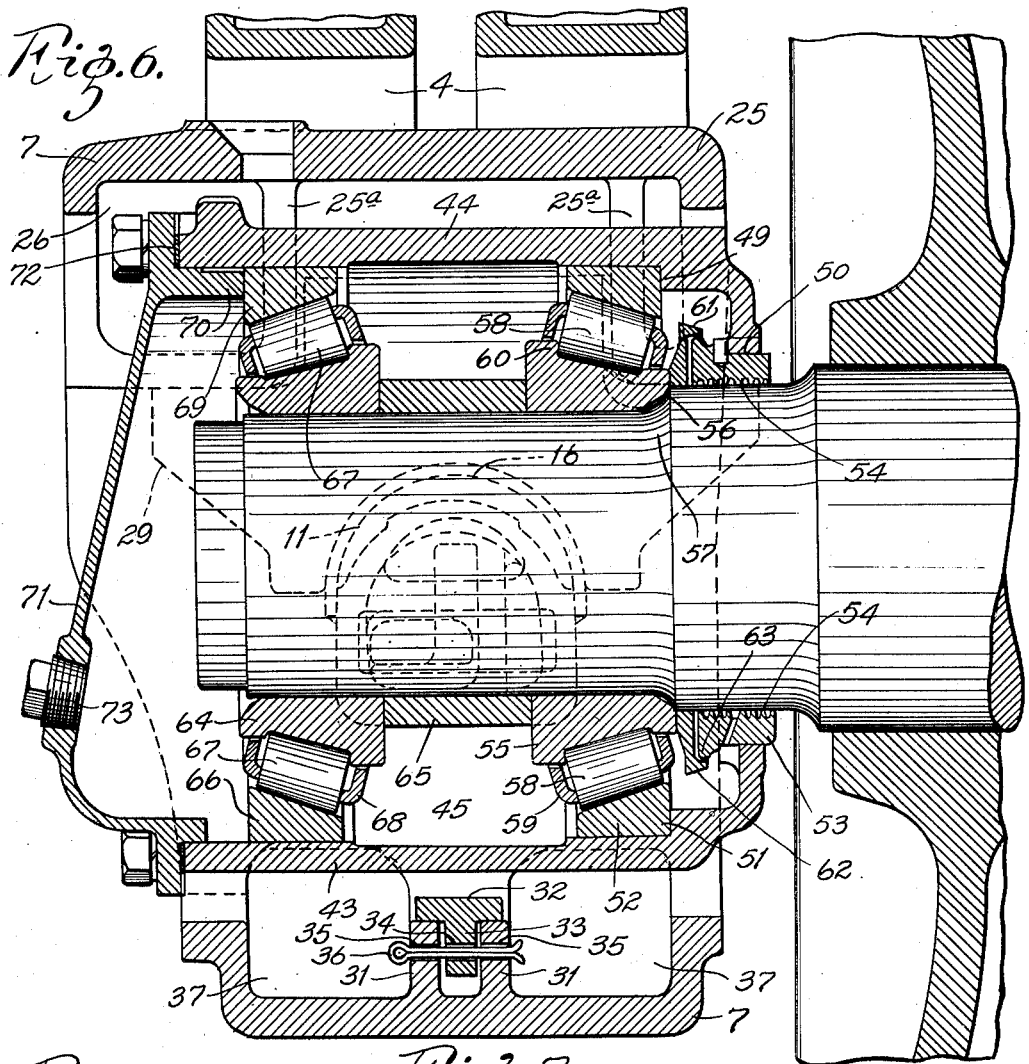

Patented Apr. 3, 1934

1,953,103

UNITED STATES PATENT OFFICE 1,953,103

CAR TRUCK

Tracy V. Buckwalter, Canton, Ohio, assignor to The Timken Roller Bearing Company, Canton, Ohio, a corporation of Ohio Application June 7, 1930, Serial No. 459,635

37 Claims. (Cl. 105—195)

This invention relates to improvements in car trucks, and particularly to the type of car truck commonly known commercially as the Buckeye car truck. The Buckeye car truck, which is a six-wheel construction, is of peculiar design in that the side frames comprise three distinct members hinged to each other and so arranged that the intermediate member acts as an equalizer for distributing the load equally on all three axles. With car trucks of this type, due to the necessity for extreme flexibility when the truck is traveling over curved track, switches, low track joints, cross overs etc., the bearings are often subjected to severe stresses which ofttimes cause serious distortion and excessive wear, whereupon the bearings must necessarily be replaced. The principal object of the present invention is to overcome these difficulties and a further object is to provide a construction which can be rapidly assembled and also one wherein the bearings may be easily replaced.

The invention consists principally in interposing roller bearings between the journal box housing and the axle neck portions, the journal box housing being so adapted, arranged and mounted in the side frames as to permit extreme flexibility of the truck. It also consists in the construction and combination and arrangement of parts hereinafter described and claimed.

Figure 4:
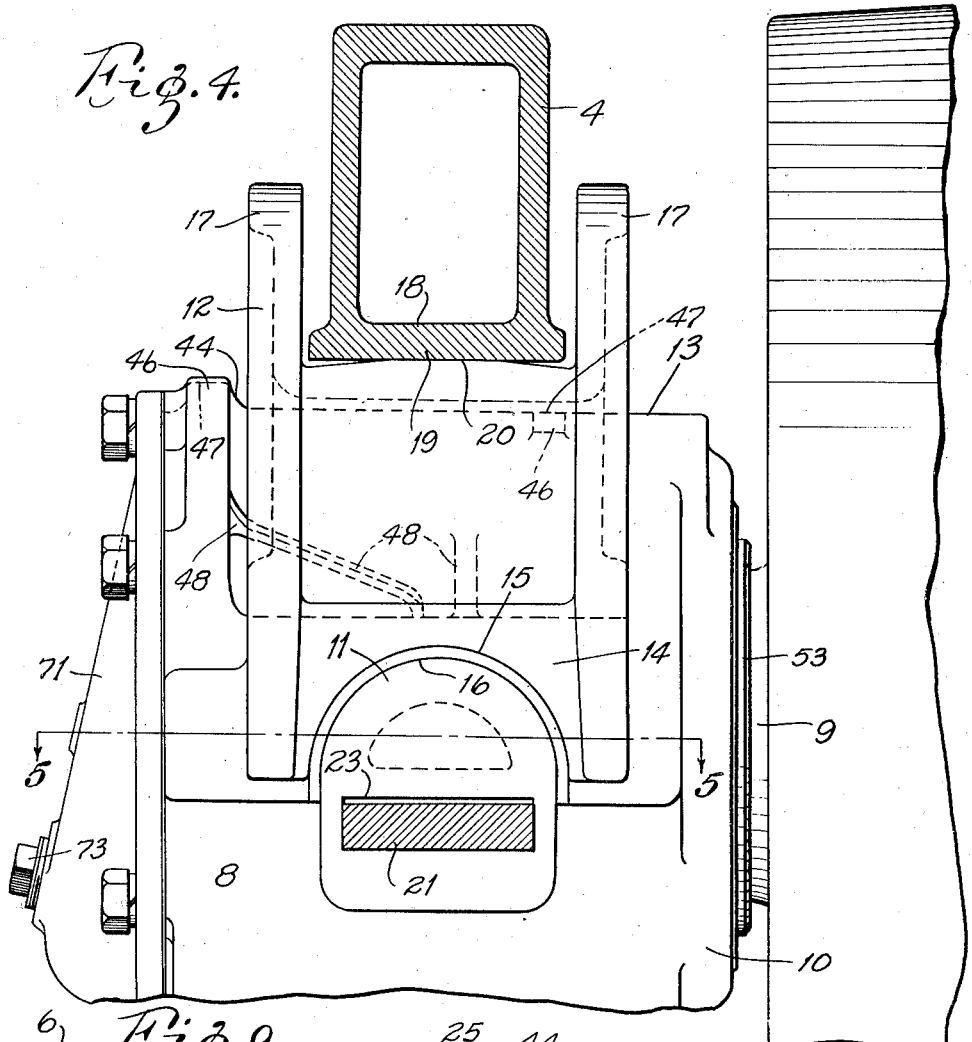
Figure 9:
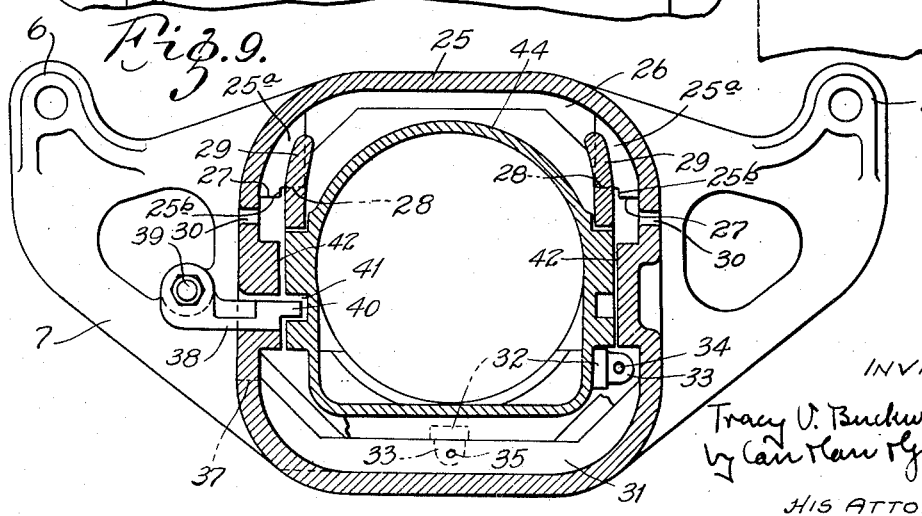

In the accompanying drawings wherein like reference numerals refer to like parts wherever they occur, Fig. 1 is a plan view of one half of a car truck embodying my invention, Fig. 2 is a side view of the car truck, Fig. 3 is an enlarged vertical sectional view along the line 3—3 of Figs. 1 and 2, showing the arrangements of the bearings at the ends, Fig. 4 is a side view of the journal box shown in Fig. 3, Fig. 5 is a section along the line 5—5 of Fig. 4, Fig. 6 is a view along the line 6—6 of Figs. 1 and 2, Fig. 7 is a detailed view of an equalizer yoke, Fig. 8 is a view along the line 8—8 of Fig. 7; and Fig. 9 is a sectional view of the equalizer member and journal box assembly, the bearings being removed.

In the construction illustrated, a center plate 1 is supported in the usual manner by two transverse truck bolsters 2 that are seated upon suitable springs 3 mounted in each end side frame 4. The end side frames 4, as is customary in car trucks of this type, are not rigidly attached to the transverse bolsters 2 and this arrangement gives the truck unusual flexibility and permits one side of the truck to run in advance of the opposite side, whereas the hinged construction of the side frame members permits both of them to move in a lateral and vertical direction.

Each side frame 5 of the truck comprises the two end side frames 4 which overlap each other transversely along the center portion of the truck, (one being stepped about midway its length to the outside and one similarly stepped in for clearance), and the ends of the overlapping portions are hinged to arms 6 extending from the intermediate or universal equalizing member 7. Each end member 4 is provided with a journal box 8 for an axle 9 whereas the equalizing member 7 carries a similar journal box for a middle axle.

Each end bearing comprises a journal box housing 10 provided with a trunnion 11 on each side, and a U-shaped load carrying yoke 12 surrounds the top portion 13 of said journal box housing and the yoke legs 14 are provided with semicircular bearing grooves 15 for engaging the top semi-circular portions 16 of the trunnions 11. It is obvious in this connection, that as the yoke merely rests on the trunnions, the journal box is free to oscillate transversely in a vertical plane and hence capable of alining itself with the axial load deflections and changes of position due to track depressions. Said trunnions are also placed at such a position on the sides of the journal box that the yoke receives the load from the box at the horizontal center line of journal, and the yoke is of such construction that the load will be transferred to the frame directly above the vertical center line of the axle.

Said yoke is provided with flanges 17 on each edge at the top which forms a sort of trough in which the pedestal portion 18 of the end side frame rests, the journal box and yoke fitting into a pedestal jaw 19. The top surface 20 of the yoke is flat whereas it is depressed near the edges so that the yoke may be capable of oscillating transversely, and said flat portion 20 of the resting surface of the yoke constitutes the means for giving the yoke initial stability, whereas the flanges are made to clear the pedestal 18 of the frame so as to allow the yoke to pivot about the contact point of the end frame in a horizontal plane.

It is obvious that this arrangement allows one frame to run in advance of the other but it also permits the journal box to remain in axial alinement. The flanges 17 on the top portion of the yoke are preferably of such height, so that in cases of extreme oscillation, any lateral thrust load will be transferred to the frame thus preventing extraneous loads to come upon the bearings in case any excessive lateral, vertical, or longitudinal displacement of the car truck frame should occur.

The assembly of the above described bearing which will help clarify the description is as follows: The yoke 12 is placed over the journal box 8 and permitted to rest on the trunnions 11 whereupon the side frame is dropped over the yoke between its flanges 17. A small rectangular keeper block 21 is then placed in a slot 22 provided in the side frame and loosely engages a recess 23 provided in one of the journal box trunnions, whereby the journal box is held in position, said keeper being suitably bolted to the end side frame by bolts 24.

The universal equalizer 7 is hinged to the side frames of the end bearings in the same manner as for standard plain bearings but in the present invention said equalizer is provided in the center with a large almost rectangular-shaped housing 25 forming an opening 26 in which the middle journal box is mounted, said journal box being identical with the journal boxes used in the end bearings and, therefore, interchangeable. Said housing 25 is provided with two ribs 25a across the top and near the front and rear, said ribs being provided at both sides of the opening with load supporting lug steps 27 and 28 adapted to engage novel equalizer yokes 29 mounted on the trunnions on either side of the journal and said yokes are curved to conform to the periphery of the journal box. The load is thereby carried from the journal box trunnions through the yokes to the lug steps on the housing. Said lug steps 27 and 28 are of a novel two-step construction, the lower step 27 being used for facilitating the assembly of said bearing and constituting the means for keeping the housing depth within the prescribed rail clearance.

Preferably, in order to help clarify the description, the manner of assembling said bearing will follow: The equalizer yoke 29 is first placed (see Fig. 9) against the sides of the housing 25 forming the opening 26, and bearing against the lower step 27 so that the journal box may be inserted and will clear and pass the equalizer yoke. After the journal box has been placed in proper transverse alinement, the universal equalizer is raised a sufficient amount to allow the equalizer yokes to pass over the journal box trunnions. When the yokes are in place the equalizer is then allowed to lower until the yokes are properly seated in the upper steps 28 of the ribs. The vertical side 25b of the step in the lugs now prevents the yokes from moving away from the trunnions and said yokes are thereby held in a locked position when under load. It is obvious that openings 30 may be provided in the housing for shifting the equalizer yokes from the assembly position to the loaded position. The bottom portion of the housing is provided with two ribs 31 near the center and constitute the means for keeping the journal box in position. This is done by a keeper piece 32, which before assembling, is placed in a position where it will clear the journal box and side walls of the housing when the journal box is being inserted. From this position it can pass down between the box and the ribs to the normal lowered position. Said keeper piece is provided with a lug 33 adapted to extend between the two ribs 31, and said lug is provided with an opening 34 to cooperate with openings 35 in the ribs of the center bottom portion whereby a cotter pin 36 may be placed through said lug to hold the same in position. This is done through two openings 37 provided in the housing on either side. It is obvious, that instead of using the above described keeper piece to hold the journal box in position a key 38 may be used. Said key may be secured to the equalizer arm by a bolt 39 and it is so constructed that a protruding end 40 of said key will engage and register with a slot 41 provided in one of the journal box trunnions. It is also to be understood that both the keeper piece and key may be used in the same construction, if desired.

The construction embodied in the equalizer housing, yoke and journal box permits free movement of the journal box so that it can remain in axial alinement with the axle for either lateral, vertical, or alinement displacement of the car truck frame. The box can oscillate about the trunnions and it can move laterally because of the clearance provided at 42, and it is obvious that the same flexibility is provided in the intermediate bearing as is provided in the end bearings.

Since the equalizer load is carried by the ends of the equalizer arm it is very desirable to apply the bearing load to the equalizer as near to these points as possible to reduce the bearing stresses. This is done in the construction illustrated, by having the lug steps on each side of the journal box housing, and the load supporting lugs are also capable of taking the lateral thrust load from the equalizer load which they may receive from the axle.

Having thus described the manner in which the journal boxes in both the end frames and the intermediate equalizer member are mounted a detailed description of one journal box and roller bearing construction will follow, it being obvious that each of the other bearings are similar.

Each journal box is shaped in the lower portion thereof in the form of a rectangular box 43 whereas the sides at the top are curved to form a semicylindrical top portion 44, the rectangular bottom portion being necessary to provide a sufficient oil reservoir 45. Preferably as a matter of precaution ribs 46 with lugs 47 thereon, are provided on the outside top of the journal box near the front and rear of said box to carry the load from the axle to the universal equalizer in case the yoke should fail in servise. Also suitable ribs 48 may be provided for guiding lubricant to the trunnion seats.

The inside rear portion of the box is constructed so as to form an annular shoulder 49 and an annular closure seat 50, and the large end 51 of the cup 52 is seated in and abuts against said shoulder. A suitable closure ring 53 is mounted in said closure seat 50, said closure ring 53 being provided with projecting tubular flanged portions 54 which encircle the axle. A suitable cone 55 is mounted on said axle and has a curved surface 56 at its smallest end which abuts against an adjacent curved shoulder 57 formed by reducing the periphery of the axle a slight distance from the closure ring, and a series of rollers 58 mounted in a suitable cage 59 are interposed between said cone and cup held in position by ribs 60 at each end of the cone raceway.

An oil flinger ring 61 is mounted on the axle between the closure ring and the small end of said cone, said oil flinger ring being provided with a projecting tubular flange 62 which surrounds an upstanding annular rib 63 on the closure ring whereby any lubricant escaping from the journal box along the closure ring will be thrown back into the journal box by centrifugal force.

Near the outer end of the axle and mounted thereon, is a second cone 64 tapering from the inner to the outer portion of the box and separated from the first mentioned cone by a suitable spacer ring 65. A cup 66 is mounted in the journal box to cooperate with said cone and a series of rollers 67 mounted in a suitable cage 68 are interposed between said cone and cup, the large end 69 of said cup abutting against an arcuate flange 70 extending from a journal box cover 71 bolted to the journal box housing, with proper shims 72 interposed between the journal box housing and the journal box cover for adjustment of the bearings. Preferably said cover is provided with a movable plug 73 for adding lubricant to the journal box reservoir chamber, and for measuring the lubricant level with a suitable gage.

What I claim is:

1. A car truck comprising three axles, journal boxes therefor provided with trunnions, roller bearings interposed between the axles and journal boxes, a yoke surrounding the top of each endmost journal box and resting on the journal box trunnions, a car truck side frame member resting on said yoke and extending to the middle axle and an equalizing member secured to the free ends of said car truck side frame members.

2. A car truck comprising three axles, journal boxes therefor provided with trunnions, roller bearings interposed between the axles and journal boxes, a yoke surrounding the top of each endmost journal box and resting on its trunnions, a truck side frame member resting on said yoke and extending to the middle axle and an equalizing member secured to the end of said frame member, said equalizing member being mounted on the middle journal box.

3. A car truck comprising three axles, journal boxes therefor provided with trunnions on each side, roller bearings interposed between the axles and journal boxes, a yoke surrounding the top periphery of each endmost journal box and resting on said trunnions, a car truck side frame member provided with a pedestal jaw for said journal box resting on said yoke and extending to the middle axle, and an equalizing member secured to the end of said side frame member.

4. A car truck comprising three axles, journal boxes therefor provided with trunnions, roller bearings interposed between the axles and journal boxes, a yoke surrounding the top of each endmost journal box, and resting on its trunnions, the top portion of said yoke being provided with upright flanges on each side thereof, and an arcuate raised flat top portion between said flanges, a truck side frame member resting on said yoke between said flanges, each side frame member extending to the middle axle and engaging an equalizing member mounted on the middle axle.

5. In a car truck, a journal box provided with trunnions, a yoke surrounding the top of said journal box and resting on said trunnions and a truck side frame member, resting on the top of said yoke.

6. In a car truck, a journal box provided with trunnions, an axle extending in said journal box, roller bearings interposed between the axle and journal box, a movable member resting on said trunnions and a car truck side frame resting on said movable member and movable transversely with respect thereto.

7. In a car truck, a journal box, an axle extending therein, roller bearings interposed between the axle and journal box, a side frame member, movable means interposed between said side frame member and said journal box for supporting said side frame member, and means for movably supporting said side frame member on said movable means to permit the roller bearings to aline themselves for vertical deflection and longitudinal displacement of the side frame with respect to the journal box.

8. A car truck comprising three axles, journal boxes therefor, roller bearings interposed between the axles and journal boxes, a yoke mounted on each endmost journal box, a car truck side frame movably resting on said yoke and extending past the middle journal box, an equalizing member movably supported by said journal box and arms extending from said equalizing member whose ends are hinged to the free ends of the car truck side frame members.

9. A car truck comprising three axles, journal boxes therefor, roller bearings interposed between the axles and the journal boxes, a yoke surrounding the top of each endmost journal box, a car truck side frame member movably resting on said yoke and extending past the middle axle, an equalizing member resting on the middle journal box, arms extending from each side of said equalizing member whose arms are hinged to the free ends of the car truck side frame members.

10. In a car truck, a journal box, an axle extending therein, roller bearings interposed between the axle and journal box, an equalizing member having a journal box receiving opening and constituting a housing for said journal box and movable means interposed between the walls of said opening and said journal box and supporting said equalizing member.

11. A car truck comprising three axles, journal boxes therefor, roller bearings interposed between the axles and journal boxes, a side frame member mounted on each endmost journal box and extending to the middle axle, an equalizing member secured to the end of each side frame member, an opening provided in said equalizing member for the middle journal box, and movable means inserted between the sides of said opening and said journal box for supporting said journal box.

12. A car truck comprising three axles, journal boxes therefor, roller bearings interposed between the axles and journal boxes, a side frame member mounted on each endmost journal box and extending to the middle axle, an equalizing member secured to the end of each side frame member, an opening provided in said equalizing member, a journal box therein, ribs extending from the top wall at the front and rear of said opening, and steps provided on the ends of each rib for engaging yoke members movably mounted on the sides of the middle journal box.

13. A car truck comprising three axles, journal boxes therefor provided with trunnions, roller bearings interposed between the axles and journal boxes, yokes surrounding the top of each endmost journal box and resting on its trunnions, a truck side frame member resting on each yoke and extending to the middle axle, and means for preventing the side frames from leaving their seats on the yokes whenever the truck is lifted vertically.

14. A car truck comprising three axles, journal boxes therefor, roller bearings interposed between the axles and journal boxes, a side frame member mounted on each endmost journal box and extending to the middle axle, an equalizing member hinged to the free ends of said side frame members and provided with an opening, ribs across its top wall and partly on the sides near the front and rear of said opening, and each rib being provided near its vertical end portion with a step for engaging yokes movably mounted on the middle journal box.

15. A car truck comprising three axles, journal boxes therefor, roller bearings interposed between the axles and journal boxes, a side frame member mounted on each endmost journal box and extending to the middle axle, an equalizing member hinged to the free end of each side frame member and provided with an opening, ribs across its top wall and partly on the sides near the front and rear of said opening, each rib being provided near its vertical end portion with a step for engaging yokes mounted on the middle journal box, and removable means for preventing said yokes from leaving their seat on said ribs.

16. In a car truck, an equalizing side frame member provided with a journal box receiving opening, a journal box therein with trunnions on each side, a removable yoke extending longitudinally with the box and resting on each trunnion whose ends engage horizontal portions of lugs extending around the wall of said opening, the vertical side portions of said lugs being interposed between the side walls of said opening and said yokes for holding the yokes in position.

17. In a car truck, a journal box provided with trunnions, a yoke resting on said trunnions and surrounding the top of said journal box, a truck side frame member resting on said yoke and having a surface contact therewith, an equalizing member hinged to the end of said side frame member and a journal box mounted in an opening provided in said equalizing member, said journal box being provided with trunnions, yokes resting on said trunnions, and said yokes supporting the equalizing member.

18. A car truck comprising three axles, journal boxes therefor provided with trunnions, a yoke surrounding the top of each endmost journal box and resting on its trunnions, a car truck side frame member resting on the top of each of said yokes having a surface contact therewith and capable of oscillating transversely, said car truck side frame member extending towards the middle axle, an equalizing member having an arm whose end is hinged to the end of said side frame member.

19. A car truck comprising three axles, journal boxes therefor having trunnions, roller bearings interposed between the journal boxes and the axles, movable members mounted on said trunnions for lateral oscillation, car truck side frame members resting on each endmost movable member to permit longitudinal oscillation thereof with respect to said journal box, an equalizing member mounted on the middle journal box provided with arms whose ends are hinged to the side frame members.

20. In a car truck, a journal box having trunnions, a yoke surrounding the top portion of said journal box and resting on said trunnions, the top portion of said yoke being provided with upwardly extending flanges on each side thereof and a truck side frame member movably supported on said yoke between said flanges.

21. In a car truck, a journal box having trunnions, a yoke surrounding the top portion of said journal box and resting on said trunnions, the top portion of said yoke being provided with a longitudinally arcuately raised portion, and a truck side frame member movably supported on said arcuate portion.

22. In a car truck, a journal box having trunnions, a movable member resting on said trunnions and a car truck side frame member movably supported on said movable member for longitudinal and transverse movement with respect thereto.

23. In a car truck, a side frame member having a journal box receiving opening, a journal box having trunnions mounted in said opening, ribs extending from the top wall near the front and rear of said opening and steps provided on the ends of each rib for engaging yoke members mounted on the journal box trunnions.

24. In a car truck, an axle, a journal box therefor having trunnions, roller bearings interposed between the axle and journal box, a yoke surrounding the top of said journal box and resting on said trunnions, a truck side frame member movably resting on said yoke, and means for preventing the side frame from leaving its seat on the yoke when the car truck is lifted vertically.

25. In a car truck, a side frame member having a journal box receiving opening, a journal box having trunnions mounted therein, ribs extending across the top wall of said opening and partly on the sides near the front and rear of said opening, and each rib being provided near its vertical end portion with a step for engaging yokes mounted on the journal box trunnions.

26. In a car truck, a journal box having trunnions, a yoke resting on said trunnions and surrounding the top of said journal box and a truck side frame member movably resting on the top of said yoke and having surface contact therewith.

27. In combination, a six-wheel car truck comprising axles, a side frame consisting of flexibly connected end members and an equalizing member, bearing housings for the axles, and rockable means connecting said housings to said side frame members, the rockable means connecting a bearing housing to an end frame member including a yoke interlocked with a pedestal jaw of the end frame member and having its ends pivotally connected to the bearing housing.

28. In combination, a six-wheel car truck comprising axles, a side frame consisting of flexibly connected end members and an equalizing member, bearing housings for the axles, and rockable means connecting said housings to said side frame members, each bearing housing having spaced upwardly extending ridges to support the side frame member with which it cooperates in case of breakage of parts.

29. In combination, a six-wheel truck comprising axles, a side frame consisting of flexibly connected end members and an equalizing member, bearing housings for the axles, each housing having oppositely extending trunnions, each of said members being rockably supported on the trunnions of the housing with which it cooperates.

30. In combination, a six-wheel car truck comprising axles, a side frame consisting of flexibly connected end members and an equalizing member, bearing housings for the axles, and rockable means connecting said housings to said side frame members, the rockable means connecting a bearing housing to an end frame member including trunnions on said bearing housing, and a yoke rockably supported by said trunnions.

31. In combination, a six-wheel car truck comprising axles, a side frame consisting of flexibly connected end members and an equalizing member, bearing housings for the axles, and rockable means connecting said housings to said side frame members, the rockable means in each instance including trunnions on the bearing housing and yoke means engaging said trunnions and interposed between the trunnions and the side frame member.

32. In combination, a six-wheel car truck comprising axles, a side frame consisting of flexibly connected end members and an equalizing member, bearing housings for the axles provided with trunnions extending lengthwise of the truck, and yoke means rockable on said trunnions, the side frame members resting on said yoke means.

33. A railway car axle construction comprising a truck side frame having an axle receiving portion, an axle extending thereinto, roller bearings on said axle, a housing for said bearings, the sides of said housing being provided with seats, and a yoke member extending over the top of said bearing housing and having depending portions whose lower ends are curved to have rocking engagement with said seats, the top of said yoke member having extended engagement with a portion of said side frame, and being free to rock relative to said truck side frame.

34. A railway car truck frame construction having an axle receiving portion, an axle having its end portion disposed in said axle receiving portion, roller bearings on the end of said axle, a tubular housing for said bearings, said housing having seats at its sides and a yoke interposed between said housing and said axle receiving portion, said yoke contacting at the top with a portion of said side frame and having rocker portions resting on said seats.

35. A railway car truck frame construction having an axle receiving portion, an axle having its end portion disposed in said axle receiving portion, roller bearings on the end of said axle, a tubular housing for said bearings, said housing having lateral projections constituting seats and a yoke interposed between said housing and said journal box portion, said yoke contacting at the top with a portion of said side frame and having rocker portions resting on said seats.

36. A railway car axle construction comprising a truck side frame having axle receiving pedestal portions, an axle extending thereinto, roller bearings on said axle, a bearing housing for said bearings and a rocker member interposed between said bearing housing and said truck side frame, said rocker member fitting snugly between said pedestal portions and being free to rock relative to both said truck side frame and said bearing housing.

37. A railway car axle construction comprising a truck side frame having an axle receiving portion, an axle extending thereinto, roller bearings on said axle, a housing for said bearings, a yoke member extending over the top of said bearing housing and having depending portions whose lower ends are rockably mounted on said bearing housing, the top of said yoke member having engagement with said side frame, and being free to rock relative thereto.

TRACY V. BUCKWALTER.